June 14, 1927. 1,632,763
P. J. KURSCHEIDT ET AL
CLUTCH
Original Filed April 29, 1922
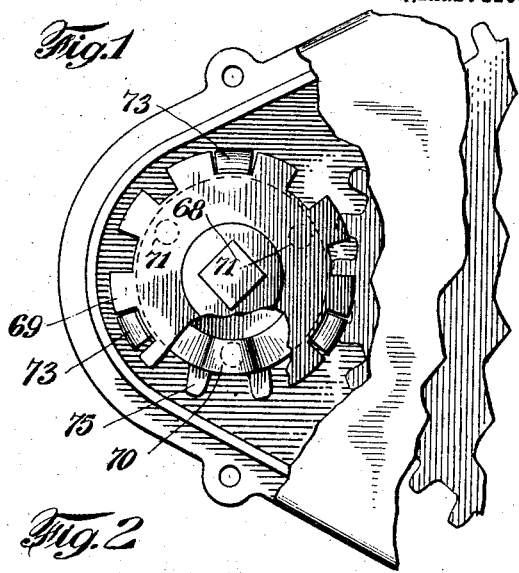
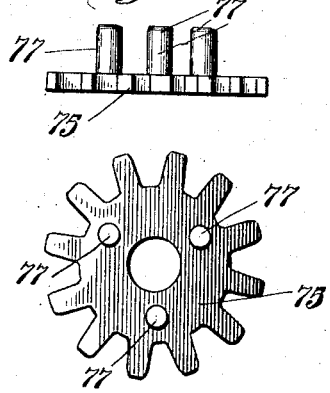
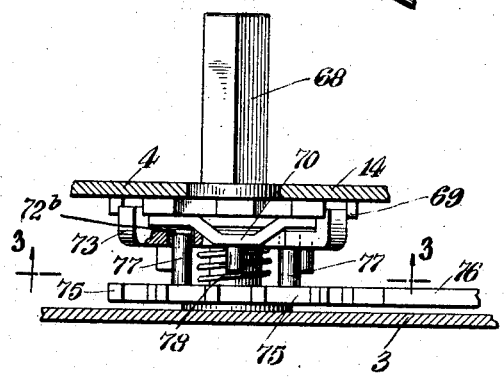
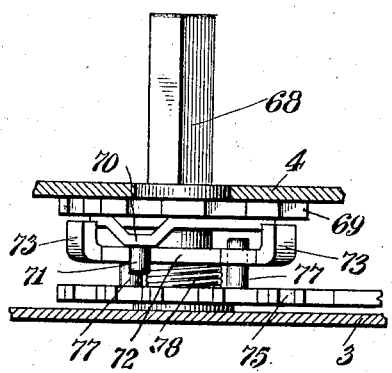
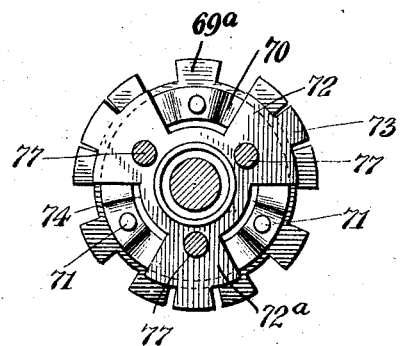
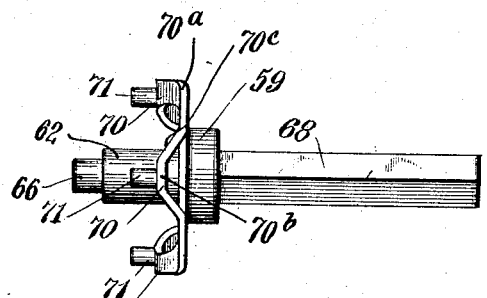
INVENTORS
Peter John Kurscheidt
Harry E. Norwood.
BY
Townsend & Decker
ATTORNEYS Patented June 14, 1927.

1,632,763

UNITED STATES PATENT OFFICE.

PETER JOHN KURSCHEIDT, OF WOODHAVEN, AND HARRY E. NORWOOD, OF BROOKLYN, NEW YORK, ASSIGNORS, BY MESNE ASSIGNMENTS, TO PERFECT WINDOW REGULATOR CORPORATION, OF LONG ISLAND CITY, NEW YORK, A CORPORATION OF DELAWARE.

CLUTCH.

Original application filed April 29, 1922, Serial No. 557,470. Divided and this application filed April 28, 1926. Serial No. 105,062.

This invention relates to improvements in clutches for window regulators or similar devices, the application being a division of United States patent application Serial No. 557,470, filed April 29, 1922.

It is one of the primary objects of the invention to provide an automatic clutch mechanism which will serve to positively lock the parts in position except when the mechanism is operated by the control handle provided for that purpose.

It is another object to provide a relatively simple mechanism for accomplishing the above purposes and one not liable to become out of order.

These and other objects will appear more fully from the following description when considered in connection with the drawings in which:

Fig. 1 is a face view of the clutch mechanism constructed according to our invention, parts of the outer casing being removed.

Fig. 2 is an edge view thereof.

Fig. 3 is a sectional view taken substantially on the line 3—3 of Fig. 2.

Fig. 4 is a side elevation and plan view of the pinion.

Fig. 5 is a view similar to Fig. 2 but showing the clutch parts in unlocked position.

Fig. 6 is a side elevation of the crank or driving shaft.

Referring in detail to the several figures of the drawing:

The casing for supporting the clutch mechanism includes the plates 3 and 4 one of which may be a lockboard and the other drawn down into engagement with the lockboard for completely housing the clutch mechanism and a portion of the operated apparatus.

The clutch mechanism includes a transverse operating shaft 68 which may be squared and arranged to have secured thereon in any desired manner a manual control handle as will be understood. The shaft 68 is provided with a reduced extension 66 forming a bearing for the end of the operating shaft. There is rigidly secured to the shaft between the plates 3 and 4 a clutch operating mechanism comprising an enlarged hub 59 to which there is secured the cam plate 70. The cam plate 70 surrounds the shaft 68 and is provided with inner portions 70ª and outer portions 70ᵇ connected by angular or cam portions 70ᶜ for a purpose to be hereinafter referred to. The outer portions 70ᵇ carry stop members 71 shown in the present instance as outwardly extending pins. The bearings 59 and 66 serve to support the transverse shaft in the casing 3, 4. The housing 4 also supports a fixed clutch member or plate 69 formed with a series of fingers or extensions 69ª adjacent the outer periphery of the same for receiving the clutch member hereinafter referred to.

The operated mechanism of the clutch includes the axially slidable clutch member 72 mounted upon the enlarged hub 62 of the shaft 68 and having the body part thereof formed of segments 72ª forming slots or cut-out portions 74, the segments terminating in transverse fingers or extensions 73 arranged to co-act with the extensions 69ª of the plate 69 for locking the clutch plate 72 to the fixed plate 69.

The operated clutch mechanism also includes the enmeshed gears 75 and 76 connected in any desired manner with the window regulator or other operated mechanism, this part of the construction forming no part of our present invention. The gear 75 is formed with transverse pins 77 arranged in parallel relation and passing through openings 72ᵇ formed in the movable clutch member 72 for causing simultaneous rotation of the clutch member and gear 75. The pins 77 and hub 62 form the support for the clutch member 72 permitting longitudinal movement of the member 72 relatively to the shaft 68 and gear 75, but causing the clutch member and gear 75 to be simultaneously rotated. The clutch member 72 is urged into locking engagement with the fixed clutch member 79 by means of the spring 78 positioned between the clutch member 72 and gear 75.

It will be noted that the extended portions 70ᵇ of the clutch plate 70 extend into and normally lie within the slots 74 of the movable clutch member 72 with the fingers 73 in engagement with the fixed clutch member 69. Upon rotation of the shaft 68 the ring 70 is rotated therewith, the cam surfaces 70ᶜ engaging the side edges of the slots 74 and causing the plate 72 to be moved axially toward the gear 75 thereby disengaging the fingers 73 from the clutch member 69. The plate 72 may ride up the inclined surfaces 70ᶜ until the portions 72ᵃ of the plate rest upon the outer surface 70ᵇ of the plate 70, additional rotation of the shaft 68 relatively to the clutch member 72 being prevented by the stop members 71. When the sections 72ᵃ are released from the upper surface 70ᵇ of the cam plate the spring 78 causes the plate 72 and fingers 73 to be moved toward the fixed clutch plate 69 and a consequent locking of the plate 72 and gears 75 and 76, further movements of the gears being impossible until the shaft 68 has been operated again to release the clutch plate 72 from the plate 69. It will be understood that the direction of rotation of the shaft 68 is of no importance, the clutch operating in exactly the same manner for either direction of rotation thereof.

While a certain specific construction is herein shown and described it is to be understood that this is merely an illustration of the invention the scope of which is to be ascertained from the appended claims.

We claim:

1. In a clutch mechanism, a rotatable operated member, a rotatable operating member rotatable with or relatively to said operated member, a fixed member, a longitudinally movable clutch member keyed for rotation with said operated member and having means formed thereon for engagement with said fixed member, spring means tending to move said clutch member into engagement with said fixed member, and means carried by said operating member for moving said clutch member out of engagement with said fixed member upon rotation of said operating member.

2. In a clutch mechanism, an operated member, means for locking said operated member against movement, an operating member, means operated by said operating member for controlling said locking means, said last named means remaining in positions of rest when said locking means is in locked and unlocked conditions respectively until said operating member is again operated.

3. In a clutch mechanism, a manual control shaft, an operated mechanism including a longitudinally movable clutch member, a fixed member, said clutch member having means for engagement with said fixed member, a cam plate carried by said control shaft and engageable with said clutch member, said plate having inner and outer engagement surfaces positioned in different planes transversely of said shaft and angular surfaces joining said first-named surfaces.

4. In a clutch mechanism, a manual control shaft, an operated mechanism including a longitudinally movable clutch member, a fixed member, said clutch member having means for engagement with said fixed member, a cam plate carried by said control shaft and engageable with said clutch member, said plate having inner and outer engagement surfaces positioned in different planes transversely of said shaft and angular surfaces joining said first-named surfaces, said movable clutch member having slots normally receiving portions of said cam plate.

5. In a clutch mechanism, a manual control shaft, an operated mechanism including a longitudinally movable clutch member, a fixed member, said clutch member having means for engagement with said fixed member, a cam plate carried by said control shaft and engageable with said clutch member, said plate having inner and outer engagement surfaces positioned in different planes transversely of said shaft and angular surfaces joining said first-named surfaces, said movable clutch member having portions separated by slots, said slots normally receiving portions of said cam plate, said portions of said clutch member engaging said cam plate to move said clutch plate from the inner to the outer engagement surfaces of said cam plate.

6. In a clutch mechanism, a rotatable operator provided with an operating element having a low portion and a high portion, a movable clutch member, means engaged with said operating element for moving said clutch member, said means resting upon either the low portion or high portion of said operating element until moved by rotation of said operator.

7. In a clutch mechanism, a clutch operator provided with an operating plate having cams thereon, a clutch member formed with slots normally receiving said cams, means tending to force said operating plate and clutch member together, said clutch member and operator being relatively movable to permit said cams to move out of said slots, and means for retaining said cams out of said slots until said operator is operated.

8. In a clutch mechanism, a clutch operator provided with an operating plate having cams thereon, a clutch member having means for engagement with said cams, said operator being rotatable relatively to said clutch member, stop members for preventing unlimited rotation of said operator relatively to said clutch member, and means for retaining said clutch member on said operator adjacent said stop member until said operator is operated.

9. In a clutch mechanism, an operating shaft, a fixed clutch member formed with locking elements, a longitudinally movable clutch member provided with locking extensions upon the outer periphery thereof adapted to engage said locking elements, and means carried by said shaft for moving said movable clutch member.

10. In a clutch mechanism, an operating shaft, a cam plate secured to said shaft and provided with cams, a fixed clutch member, an operated member, a movable clutch member loosely mounted upon said operated member for rotation therewith and formed with circumferentially spaced portions engaged with said cam plate, said portions being constructed to be engaged and moved by the cams on said plate when said shaft is rotated, and means tending to force said movable clutch member toward said cam plate.

Signed at New York in the county of New York, and State of New York this 27th day of April A. D. 1926.

PETER JOHN KURSCHEIDT.
HARRY E. NORWOOD.